United States Patent
Janssen et al.

(10) Patent No.: US 6,950,652 B2
(45) Date of Patent: Sep. 27, 2005

(54) REMOTE MANAGEMENT OF AN EXTERNAL PHONEBOOK

(75) Inventors: Holger Janssen, Richmond (CA); Gary Louie, Vancouver (CA); James Dury, Vancouver (CA); Sean Wong, Vancouver (CA)

(73) Assignee: VTech Telecommunications Limited, Hong Kong (HK)

( * ) Notice: Subject to any disclaimer, the term of this patent is extended or adjusted under 35 U.S.C. 154(b) by 171 days.

(21) Appl. No.: 10/338,439

(22) Filed: Jan. 8, 2003

(65) Prior Publication Data

US 2004/0131173 A1 Jul. 8, 2004

(51) Int. Cl.⁷ .......................... H04Q 7/20; H04M 1/00
(52) U.S. Cl. .................. 455/419; 455/420; 455/462; 455/418; 379/355.02; 379/355.03; 379/355.07; 379/355.09
(58) Field of Search ................. 455/418, 419, 455/420, 550.1, 462, 88; 379/355.02, 355.03, 355.07, 355.09, 355.04, 355.05, 356.01

(56) References Cited

U.S. PATENT DOCUMENTS

| | | | | |
|---|---|---|---|---|
| 5,768,362 A | * | 6/1998 | Moon .................... | 379/355.05 |
| 5,983,266 A | * | 11/1999 | Tadman et al. ............. | 709/216 |
| 6,021,321 A | * | 2/2000 | Kawashima ............... | 340/7.43 |
| 6,049,804 A | * | 4/2000 | Burgess et al. ............. | 707/100 |
| 6,160,997 A | * | 12/2000 | Oberlaender ............... | 455/567 |
| 6,301,646 B1 | * | 10/2001 | Hostetter .................... | 711/206 |
| 6,377,959 B1 | * | 4/2002 | Carlson ...................... | 707/202 |
| 6,542,733 B1 | * | 4/2003 | Dennis ....................... | 455/433 |

FOREIGN PATENT DOCUMENTS

| | | |
|---|---|---|
| EP | 1322099 | 6/2003 |
| JP | 7-264294 | 10/1995 |
| WO | WO 02/23871 | 3/2002 |

OTHER PUBLICATIONS

UK Search Report (copy).
Nokia PC Connectivity SDK 2.1 Component Library Reference for Nokia Phones, http://ncsp.forum.nokia.com/support/?body=detail&aid=1711.

* cited by examiner

*Primary Examiner*—Binh Tieu
*Assistant Examiner*—Tuan Pham
(74) *Attorney, Agent, or Firm*—Pillsbury Winthrop Shaw Pittman LLP

(57) ABSTRACT

The present invention permits access to information stored on a remote device from a local device without requiring that a complete physical copy of the remote information be made. An enhanced and refined hash table permits access to the remote information in order or according to a search key with significant reduction in the memory requirements on the local device even though the remote information is not sorted. Scrolling through the remote data structure without accessing any unnecessary record on the remote device and hence reducing scroll response time is also achieved.

25 Claims, 9 Drawing Sheets

| INDEX | NAME | PHONE |
|---|---|---|
| 1 | ANNA WILLIAMS | 111-1111 |
| 2 | ANDROIDS R US | 222-2222 |
| 3 | ANNA KARENIN | 333-3333 |
| 4 | ANITA MUI | 444-4444 |
| 5 | ANNE RICE | 555-5555 |
| 6 | ANTHONY HOPKINS | 666-6666 |
| 7 | ANDY LAU | 777-7777 |

| AN | | | | | |
|---|---|---|---|---|---|

FIG. 5B

| AN | 1 | | | | |
|---|---|---|---|---|---|

FIG. 5C

| AN | 2 | 1 | | | |
|---|---|---|---|---|---|

FIG. 5D

| AN | 2 | 3 | 1 | | |
|---|---|---|---|---|---|

FIG. 5E

| AN | 2 | 4 | 3 | 1 | |
|---|---|---|---|---|---|

FIG. 5F

| AN | 2 | 4 | 3 | 1 | 5 |
|---|---|---|---|---|---|

FIG. 5G

| AN | 2 | 4 | 3 | 1 | &FREE37 |
|---|---|---|---|---|---|
| FREE37 | &AN | 5 | 6 | | |

FIG. 5H

| AN | 2 | 7 | 4 | 3 | &FREE37 |
|---|---|---|---|---|---|
| FREE37 | &AN | 1 | 5 | 6 | |

REMOTE MANAGEMENT OF AN EXTERNAL PHONEBOOK

BACKGROUND OF THE INVENTION

1. Field of the Invention

This invention relates generally to electronic devices capable of storing telephone book information such as names and phone numbers and, more particularly, a method and apparatus for providing alphanumerically sorted access to telephone book information stored in other electronic devices in an embedded system having crucial memory size restrictions with an application demanding immediate response to user initiated requests.

2. Background Art

Various electronic devices which store telephone book information, including names, telephone numbers, facsimile number, email addresses etc., are currently available to consumers and in increasingly common use. Such devices include conventional telephones, cellular or wireless telephones, Personal Digital Assistants (PDAs), portable email terminals and personal computers (PCs). Unfortunately, the information stored in one device often cannot be accessed by another device. For example, if a user stores telephone book information in a PDA, that telephone book information typically cannot be accessed from the user's cellular telephone. Rather, to locate and dial a telephone number the user must first look up the desired name and phone number on the PDA and then type the phone number into the telephone keypad. This can be a cumbersome task—especially when the user does not have both hands available or needs to make several telephone calls.

Certain prior art attempts have been made to address this problem. For example, some devices offer the user the ability "synchronize" with another device via and infrared (IR) link, a serial cable, a USB cable, or a wireless communications link whereby the data stored in one device is made to resemble the data stored in the other device and changes made to the data in either device are reflected in both devices. Accordingly an exact copy of the data is made to exist in each of the first and second devices. While useful, most methods of synchronization have some drawbacks. First, since these methods typically require that both devices dedicate enough memory to store the entirety of the synchronized data as the synchronization process copies each record completely between devices. Second, synchronization techniques typically require sophisticated software capable of translating between what are often proprietary data formats. Finally, records stored in a device are up to date only as of the last time the devices were synchronized. If a particular record has been updated on one of the devices since the last synchronization, the updated information will not be available to the other device.

In order to encourage interoperability between devices, manufacturers often publish interface specifications for interfacing with their devices. For example, Nokia Group Finland provides instructions for interfacing a NOKIA telephone with a personal computer in the document entitled *Nokia PC Connectivity SDK* 2.1 *Component Library Reference for Nokia Phones*. Thus, techniques for accessing phonebook and other information stored by portable electronic devices are known in the art.

Many portable electronic devices, such as GSM cellular telephones which store phonebook information on SIM cards, also store phonebook entries in the order in which they are entered in the memory by the user. Thus, the entries are typically not sorted alphabetically or in any other orderly fashion within the device memory. In accordance with another aspect of the invention, unsorted information in the phonebook of a first device can be displayed in alphabetical sequence on another device without storing the entire contents of the phonebook information.

Thus, with typical prior art devices, a user must either (1) independently access and constantly juggle more than one device to "share" information, or (2) spend a great deal of time and effort entering, updating and synchronizing telephone book information in each device that the user owns. This is not only inconvenient, but in some cases increases the cost of the device, as well as the time and effort required to operate them.

Accordingly, one advantageous aspect of the invention provides for reduced memory costs and improved convenience by providing a method and apparatus for making telephone book information stored in a first electronic device available to other electronic devices without having to store the entirety of the first device's information in each of the other devices.

In some applications typical prior art synchronization techniques may also raise privacy and security concerns. For example, a visitor may desire to interface his cellular phone with the home telephone system of a personal being visited, so that the cellular phonebook is accessible via the home telephone system for the duration of the visit. However, it may not be desirable to provide the home telephone system with a permanent copy of the cellular user's entire phonebook. Therefore, another aspect of the present invention allows a user to interface an electronic device with other devices without the wholesale copying of private information.

Yet another aspect of the present invention allows the use of EEPROM memory because the need for fast read/write times is reduced. Home telephones or other access devices may also be constructed with smaller amounts of memory, thus lowering cost and improving reliability.

The prior art has included the use of software based hash tables to access stored data. A typical hash table comprises a data table storing items or keys in which keys are mapped to array positions by a hash function. The hash function typically maps keys to integers, such as to get an even distribution on a smaller set of values.

Conventional hash tables have significant drawbacks that have prevented their use in the context of the aforementioned application. In particular hash tables typically use linked lists that require more memory than tables. This may be undesirable for an embedded application in a consumer product. Moreover, hash tables are typically oversized to ensure that only few entries are made in each slot which again unfavorably impacts memory requirements. The access performance of a conventional hash table rapidly degrades when a single hash table slot contains numerous entries. In particular, scrolling in alphanumerical order through a "classic" hash table slows down proportionally to the number of entries of the slots. Similarly "unnecessary" redundant accesses to data pointed to by the hash table entries increase proportionally to the number of entries of the slots.

The present invention circumvents these limitations. A local data structure is implemented on a home phone to provide access to the address book stored in the memory of a cell phone from the comfort of a home phone (corded or cordless base or handset). Using the methods of the present invention the home phone can initialize and maintain the local data structures to the aforementioned purpose with a total memory size significantly smaller than that of the cell phone address book.

These and other desirable characteristics of the present invention will become apparent in view of the present specification and drawings.

SUMMARY OF THE INVENTION

The present invention allows data records such as telephone book entries stored on a first device, to be accessed by a second device such as a cordless telephone system, without storing the entirety of the accessed data on the second device.

The first device includes a storage medium which holds records of telephone book information. The first device communicates with the second device via an interface. The second device is able to access the storage medium in the first device via the interface.

The second device contains a memory that is built up to contain information referencing the entries in the phonebook storage medium of the first device. In accordance with one embodiment of the invention, the second device memory can specifically be built up as a modified Hash table. The table stores index values in a series of slots, each slot being further subdivided into a series of cells. At least some of the slots are preferably designated as "home slots" for particular alphanumeric sequences.

Upon initiating communications between the first and second device via the interface, the reference table within the second device can be populated. The index values may be stored in the appropriate home slot such that the home slot's alphanumeric sequence matches the alphanumeric sequence of the telephone book record identified by the index value. The index values may further be sorted within each home slot; in other words, when read in sequence the index values identify an alphabetically sorted list of records.

In an additional embodiment of the present invention, the index values may comprise an additional "update flag" bit, which may be used during synchronization to identify old records to be deleted.

An apparatus according to the present invention may comprise a cellular telephone and a cordless telephone connected by an interface. The cellular telephone contains telephone book records. The cordless telephone contains a sorted list of index values which point to a respective telephone book record. The index values may be stored in a series of slots and cells, such that the stored index values, when read in sequence, identify an alphabetical list of records. In all of the above embodiments, the telephone book records may be browsed or searched via the cordless telephone. The described algorithms and data structures circumvents the limitations of "traditional" hash tables that would prevent their application to an embedded system where memory requirements have to be minimized. Moreover, the described algorithms and data structures further minimize the number of accesses to the remote device holding the telephone book. In the present invention instantiation accesses to the cell phone address book are very slow. The desired response time for scrolling through the cell address book requires that the access to the cell address book be deterministic—i.e. get the desired "next" address in one shot (e.g. one access to cell phone to get the alphanumerically next address book entry).

BRIEF DESCRIPTION OF THE DRAWINGS

For a better understanding of the present invention, reference may be had to the accompanying drawings in which:

FIG. 4 is a table containing sample telephone book data.

FIG. 5 is a block diagram illustrating the various states of memory slot "AN" as the data of FIG. 4 is sorted.

DETAILED DESCRIPTION

Figure 1:
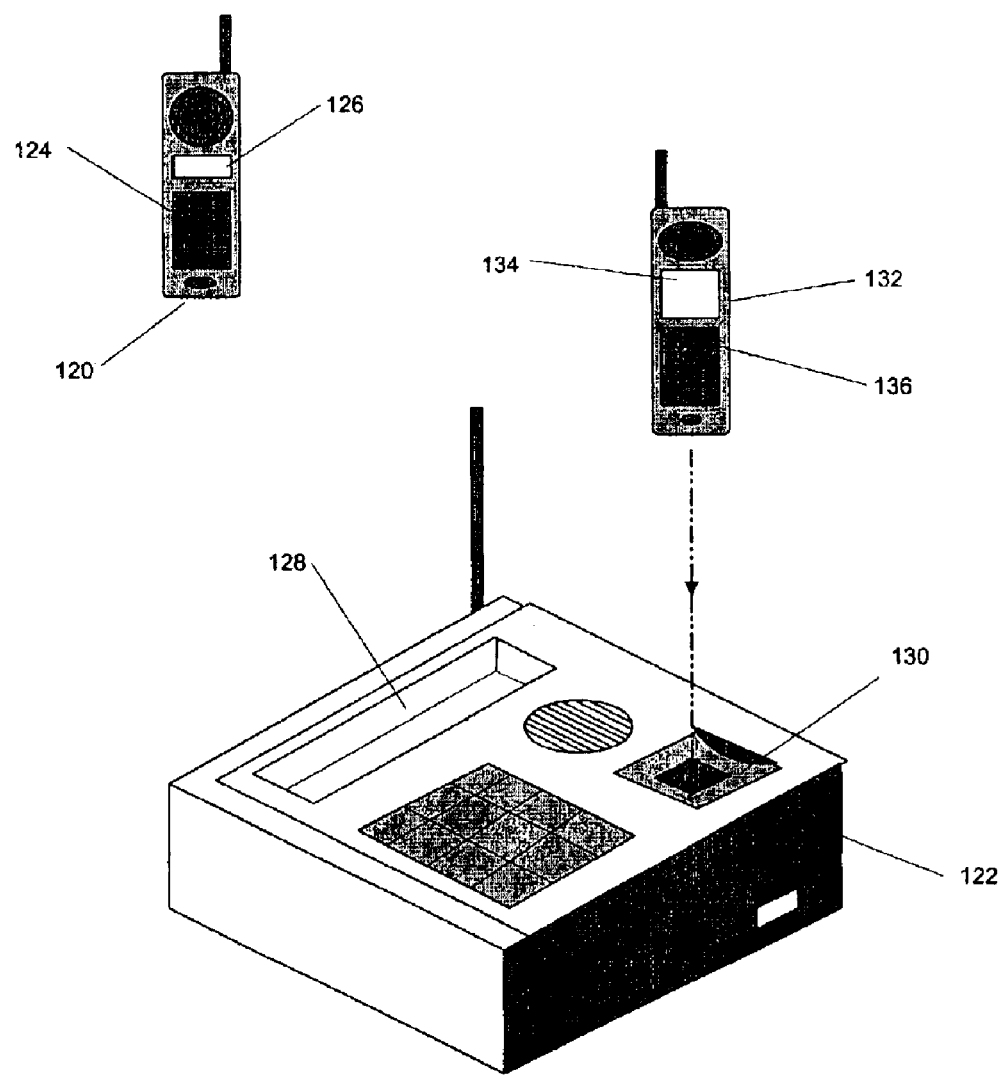
FIG. 1 is a perspective view of one embodiment of the present invention comprising a cordless telephone system and a cellular telephone.

While this invention is susceptible of embodiment in many different forms, there are shown in the drawings and will be described in detail, a preferred embodiment, with the understanding that the present disclosure is to be considered as an exemplification of the principles of the invention and is not intended to limit the invention to the embodiments illustrated.

Particularly, the objects and advantages of the present invention can be achieved by providing a first electronic device and a second electronic device, wherein the first electronic device has telephone book information stored in non-volatile memory. The second electronic device may access the telephone book information stored in the first electronic device's memory via an interface. However, rather than copying the entirety of the data stored in the first electronic device's memory into the second electronic device's memory, the second electronic device merely stores an ordered list of "pointers" or addresses which indicate where in the first electronic device's memory each particular record is stored. This allows a second device to access the records of a first device in a real-time manner, without requiring the entire contents of each individual record in the first device to be transferred to the second device.

One skilled in the art will recognize that this technique may be applied among virtually any number of electronic devices. For purposes of simplicity, this specification discusses the proposed method in the context of using a cordless telephone to access information stored in a cellular or wireless telephone handset. However, it is intended that this invention could be applied in a number of contexts—for example, as between a PC and a cellular telephone, a PC and a PDA, and as between a PDA and a cellular telephone, etc.

An embodiment of the invention is disclosed in the context of the apparatus illustrated in FIG. 1. FIG. 1 shows a cordless telephone system having cordless handset 120 and base unit 122. Handset 120 is a typical battery powered cordless telephone handset as is well known in the art, and comprises keypad 124 and Liquid Crystal Display (LCD) 126. Keypad 124 may be used to manipulate menus governing phone settings or may be used to navigate telephone book information wherein names and numbers are stored in memory associated with the cordless handset. The corresponding menus and telephone book information are preferably displayed on LCD 126. A similar menu is used to navigate the cell phone address book by means of keypad 124.

Base unit 122 may include handset cradle 128 or the handset may have a standalone charger and cellular telephone cradle 130. Data transfer can also be connectionless—e.g. through wireless communication standards such as Bluetooth™. Both handset cradle 128 and cellular telephone cradle 130 have electrical contacts (not shown) for interfacing the electrical circuitry in base unit 122 with handset 120 or cellular telephone handset 132, respectively. While cellular cradle 130 is illustrated and being integrated into base unit 122 in the embodiment of FIG. 1, it is understood that in alternative embodiments, a physically separate cellular cradle unit could be provided, having an electrical link between the cellular cradle and base unit 122. According to the foregoing device a user can elect to make or receive a telephone call by using the cordless handset 120 to access either the public switched telephone network (PSTN) to which the base unit 122 is physically connected, or when cellular telephone 132 resides in cradle 130, the cellular or wireless telephone network to which cellular telephone 132 wirelessly connects.

In practice, and as will be described in more detail below, a user may store telephone book information in cellular telephone handset 132 by entering the information via cellular telephone handset keypad 136. Alternatively large address books can be created by downloading from PC. For cellular telephones, phonebook entries are stored within telephone memory in the order in which each record or entry is entered, starting with the first available memory location within the phonebook memory. Thus, many cellular telephones build up a phonebook table that is not necessarily sorted in an alphabetical or other orderly fashion.

The user can typically view telephone book information via cellular telephone display 134, and can place a call to that number via the cellular telephone network in an automated fashion. However, in some circumstances, a user may desire to place a call using the cordless telephone handset 120 rather than cellular telephone 132. As described herein, the present invention functions, in part, to allow a user of cordless handset or a base station equipped with LCD and keypad 120 to access the telephone book information stored in cellular telephone 132.

Specifically, when cellular telephone 132 is placed in cellular telephone cradle 130, interface 112 (shown in FIG. 2) is set up via electrical contacts within the cradle (not shown). As will be described in greater detail below, whenever the cellular telephone 132 is placed in cellular telephone cradle 130, cordless telephone handset 120 initiates a software driven indexing routine. Particularly, cordless telephone handset 120 reads telephone book information from cellular telephone 132, one entry at a time.

The entries are read sequentially by index number. Base unit 130 then stores the index number in an index table memory. Cordless telephone handset 120 stores only references to the telephone book information found in cellular telephone 132 but does not copy all of the data stored in cellular telephone 132. When the user wishes to access the telephone book information, he may pick up cordless telephone handset 120 and use keypad 124 to browse or search the telephone book entries, while viewing the entries being browsed or searched on LCD 126. Once a number is displayed on cordless handset the user may "use" this number to initiate a call on home or cell line or to store it in the local address book of the cordless handset. As will be described below, each time the user scrolls through the telephone book entries, cordless telephone handset 120 requests the required information from cellular telephone 132, using the index previously created. Thus, the user may access his entire set of telephone book information without having to copy that information from cellular telephone 132 to cordless telephone 120. This allows cordless telephone handset 120 to be manufactured at a lower cost, due to decreased memory requirement. This further prevents many of the headaches otherwise commonly associated with full record synchronization. In addition, according to the illustrated example, a user may cradle his or her cellular phone in another user's compatible cordless base unit toward making use of the cellular telephone's phonebook information while at another location, for example a friend's home, and may thereafter remove the cellular phone and not leave behind all of his or her telephone book data on the friend's telephone base unit.

Figure 2:
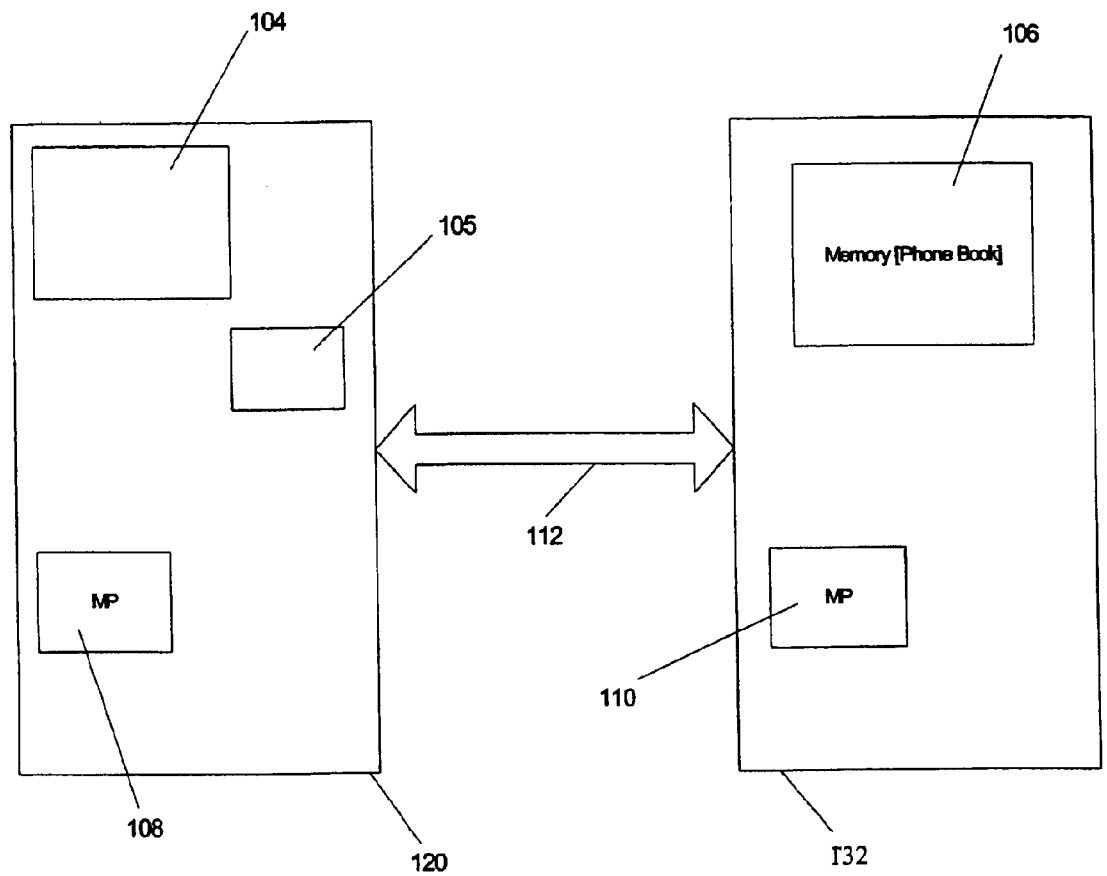
FIG. 2 is a block diagram representing the cordless telephone handset and the cellular telephone of FIG. 1.

FIG. 2 is a block diagram representing cordless telephone handset 120 and cellular telephone 122. Cordless telephone handset 120 includes storage medium 104 and volatile storage medium 105. Storage medium 104 is preferably a form of non-volatile memory, such as EEPROM, while volatile storage medium 105 is preferably Random Access Memory (RAM) 105. Cordless telephone handset 120 also includes microprocessor 108, which can read from and write to storage mediums 104 and 105, as well as pass messages to cellular telephone 132 through interface 112. In one embodiment, the hash table is stored once in the base. Each handset uses services of the base station to access the cell address book. As a result only one instance of the hash table exists regardless of the number of cordless handsets registered to the base station.

Cellular telephone 132 includes storage medium 106 as well as microprocessor 110. As with storage medium 104, storage medium 106 is a form of non-volatile memory, such as EEPROM, or in the case of GSM cell phones which store address books on a SIM card so that user can port his phone number and address book between different phones. Storage medium 106 includes at least some telephone book information. Microprocessor 110 can read information from storage medium 106 and pass information along to interface 112, in response to a request from cordless telephone handset 120.

Interface 112 between the base unit and cell phone generally comprises interface hardware and driver software. Specifically, it comprises the hardware and software required for microprocessor 108 and microprocessor 110 to exchange messages. Interface hardware is well known in the art and may include a form of UART connection, an RS232 cable, an infrared (IR) transceiver, a radio transceiver such as a Bluetooth™ transceiver, or even the electrical contacts of base unit 122. Driver software is also well known in the art and is specific to a particular device. Typical specifications for cellular phone driver software may be found in the *Nokia PC Connectivity SDK 2.1 Component Library Reference for Nokia Phones* or the AT command specification supported by the GSM cell phone community.

Figure 3:
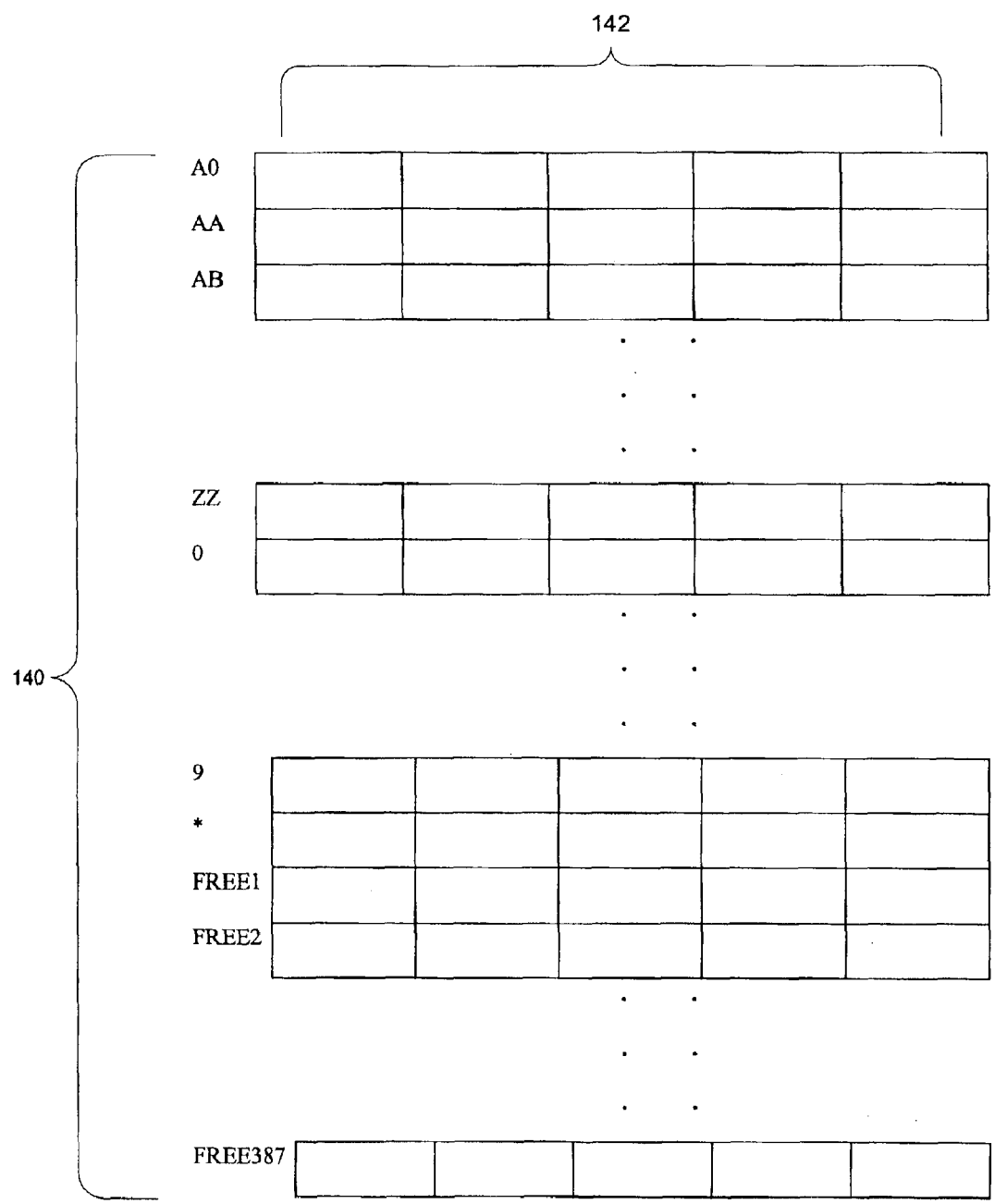
FIG. 3 is a block diagram illustrating the preferred memory structure for storing telephone book record index values.

FIG. 3 illustrates the structure of storage medium 104. Particularly, storage medium 104 is organized into a series of slots 140. Each slot is further subdivided into a fixed number of cells 142. In the preferred embodiment of the present invention, each slot 140 comprises five cells 142, each cell being sixteen bits wide. Some of the available slots are designated "home slots," and are assigned to specific, two-character alphanumeric sequences, beginning with A0 and ending with ZZ. Other slots are assigned to each of the numbers zero (0) through nine (9), one slot is assigned to "symbols," and the remaining slots are designated as "free slots." In the particular embodiment illustrated, there are seven hundred and two (702) slots assigned to the alphanumeric sequences A0 through AZ, ten slots assigned to the digits zero (0) through nine (9), one slot assigned to symbols, and three hundred and eighty seven (387) slots designated as free slots for a total of one thousand one hundred (1100) slots.

The purpose of this particular organization of memory space is to provide a memory structure that is both efficient and is easily searchable. Thus, references to phone book entries with names beginning with "AA" may be placed in the "AA" home slot; references beginning with "AB" may be placed in the "AB" home slot, and so on. As will be described below, this allows the user to browse through the series of entries in alphabetical order. It is important to note that only references or "pointers" to the original telephone book data are stored in storage medium 104—thus, cordless telephone handset 120 requires much less memory than it would require if it copied the entirety of each telephone book data record. It is, of course, well known to those skilled in the art that the particular combinations of available slots may take any form, depending on the size of the memory available and upon the particular application. According to the illustrated example, the first two letters of the name entry in the address book entry are used, but any other key can be used as is known in the art. For example, the home slots could be organized using three-letter alphanumeric sequences instead of two-letter sequences, at the expense of requiring additional storage space. Alternatively, the last two digits of the phone number can be used to achieve a lesser number of slots (i.e. 100). Numerous other variations are possible, such as varying the number of free slots, the number of cells per slot, or the size of the individual cells.

Turning to FIG. 4, the data structure of the cellular handset 132 telephone book information stored in storage medium 106 is shown. Telephone book data is preferably stored in table form, with each row representing one record of data. The records in this example will be referred to as Records 1 through 7. Each record comprises a series of fields—in this example, INDEX, NAME, and TELEPHONE. The data may or may not be in alphabetical order—in many cellular telephones, for example, telephone book information is indexed according to it's date of entry, not its alphabetical order. The INDEX value need not necessarily be a number; it can be any value which uniquely identifies a given record. The particular format of the data will vary depending on the particular device in which the data is stored. Accordingly, the data fields shown in FIG. 4 are merely representative of data fields typically stored in such devices.

In order for cordless telephone handset 120 to access this data, it must know where to find each record of information—particularly, it must know the INDEX value of each Record 1–7. In addition, it is advantageous for the cordless telephone handset to store the INDEX values according to the alphabetical rank of the record, in order to allow more efficient browsing (scrolling up and down) of telephone book information. Because telephone book data is not stored alphabetically in cellular telephone 132 (sorting of the telephone book data is usually carried out by the telephone's firmware during operation or during initialization of the cell phone after power up), cordless telephone 120 must organize the records when storing the INDEX values of the records in some order, be it alphabetical or otherwise.

Figure 6:
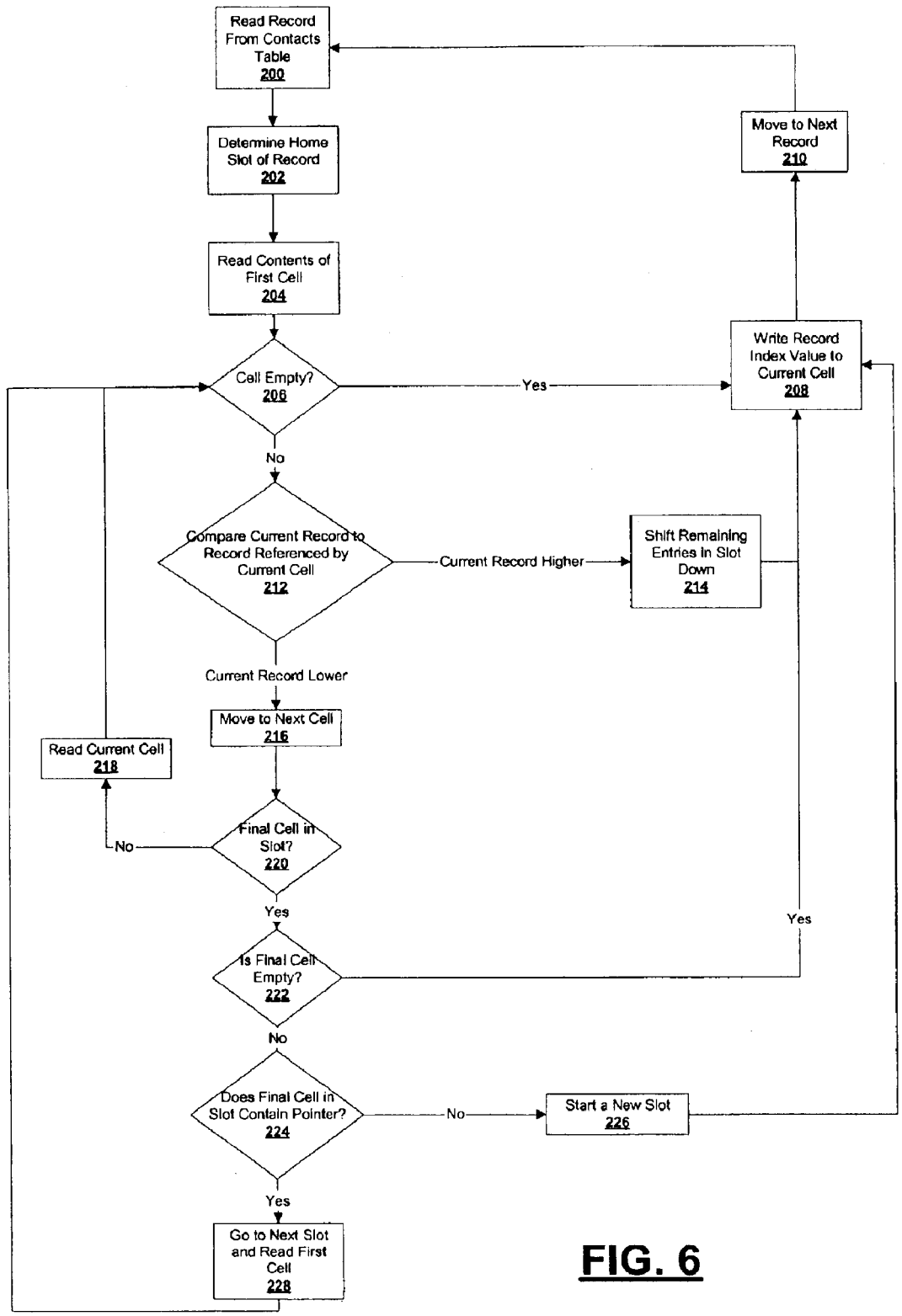
FIG. 6 is a flowchart illustrating the logical process required to sort the index values of FIG. 4 into the memory structure of FIG. 5.

When a cordless telephone handset 132 is first placed in the base unit 122 an initialization process is executed by the base unit 122. During this initialization, base unit microprocessor 108 systematically requests each record from the telephone book stored in cellular telephone 132, determines the proper alphabetical location for that particular record, and stores that record's INDEX value in storage medium 104 within base unit 122. This process is described in greater detail in connection with FIGS. 5 and 6. FIGS. 5A–H illustrate the "AN" home slot as it is filled with the data of FIG. 3, while FIG. 6 illustrates the logical process used to sort the data. In discussing the slots illustrated in FIG. 5, the leftmost cell shall be considered the first cell in the slot and the rightmost cell shall be considered the fifth or last cell in the slot, with the cells in between being consecutively numbered as appropriate.

The initialization procedure begins with base unit microprocessor 108 requesting Record 1 from cellular telephone 132, Step 200. Specifically, microprocessor 108 passes this request to cellular telephone 132 via interface 112, and specifically, cellular telephone microprocessor 110. Cellular telephone microprocessor 110 receives the request from interface 112 and responds to the request by reading Record 1 from storage medium 104 and sending Record 1 back to microprocessor 108 across interface 112. Microprocessor 108 receives Record 1 and stores it temporarily in RAM 105.

Microprocessor 108 then determines the home slot of the record relative to the NAME field, Step 202. For example, since the NAME value of Record 1 is "Anna Williams," microprocessor 108 looks up the address of the "AN" slot. This address lookup can be accomplished by means of a lookup table stored within storage medium 104, or in other cases may simply be calculated. Both methods for determining the slot's address are well known in the art. Microprocessor 108 then reads the first cell of the "AN" slot, Step 204. Because the cell is empty, Step 206, microprocessor 108 writes Record 1's INDEX value to the cell, Step 208. Microprocessor 108 moves to the next record, Record 2, and requests that record from cellular telephone 132, Steps 210, 200.

The result of this operation is shown in FIG. 5B. In FIG. 5B, the first cell of slot "AN" contains the value "1," which is the INDEX value of Record 1. The remaining cells are empty because no other records having a NAME field beginning with "AN" have been read in yet.

Microprocessor 108 begins to repeat these Steps for Record 2. Particularly, microprocessor 108 reads Record 2 from cellular telephone 132, Step 200, determines the home slot of that particular record, Step 202, and reads the contents of the first cell in home slot "AN," Step 204. However, the first cell of slot "AN" is no longer empty, Step 206, so microprocessor 108 must compare Record 2 to Record 1 in order to determine which one is "higher" alphabetically, Step 212. While Record 2 is still stored in RAM 105, Record 1 may no longer be in RAM 105. If this is the case, microprocessor 108 must request Record 1 from cellular telephone 132 and store Record 1 in RAM 105 in order to perform the required comparison. With both Records 1 and 2 stored in RAM 105, microprocessor 108 then compares the value of their respective NAME fields, using techniques well known in the art, in order to determine which record is alphabetically higher, Step 212. Because Record 2 ("Androids R Us") is higher than Record 1 ("Anna Williams"), microprocessor 108 shifts Record 1 down one cell (from the first cell to the second cell), Step 214, and inserts Record 2 into the first cell of slot "AN," Step 208. Microprocessor 108 then requests the next record, Record 3, and reads that record into RAM 105, Steps 210, 200.

The results of this process are illustrated in FIG. 5C. In FIG. 5C, the first cell of slot "AN" contains the value "2" and the second cell of slot "AN" contains the value "1." The remaining cells of slot "AN" are empty.

Microprocessor 108 next determines the home slot of Record 3 to be the "AN" slot, Step 202, and reads the contents of the first cell, Step 204. Because the first cell of the "AN" slot contains the value "2," Step 206, microprocessor 108 requests the record having an INDEX value of 2. Microprocessor 108 then compares the NAME value of Record 2 to the NAME value of Record 3 in order to determine which value is alphabetically higher, Step 212. Because the NAME value of Record 3 is alphabetically lower than the NAME value of Record 2, microprocessor 108 leaves the first cell alone and looks at the second cell, Step 216. The second cell is not the final cell in slot "AN," Step 220, so microprocessor 108 reads the contents of the cell, Step 218, and determines that the second cell is not empty, Step 206. Because the second cell contains a value of "1," microprocessor 108 requests Record 1, and compares Record 1 to Record 3. Because Record 3 ("Anna Karenin") is alphabetically higher than Record 1 ("Anna Williams"), microprocessor 108 moves the contents of the second cell to the third cell, and writes the INDEX value of Record 3 to the second cell, Steps 214, 208.

The result of this operation is shown in FIG. 5D. In FIG. 5D, the first cell of slot "AN" contains the value "2," which is the INDEX value of Record 2. The next cell contains the value "3," which is the INDEX value of Record 3, and the third cell contains the value "1," which is the INDEX value of Record 1.

Microprocessor 108 next reads in Record 4, and inserts its INDEX value into the second cell, shifting the remaining values down one cell as shown in FIG. 5E. Microprocessor 108 then repeats the process for Record 5, inserting its INDEX value into the fourth cell and shifting the remaining values down one cell as shown in FIG. 5F.

When microprocessor 108 reads in Record 6, it compares Record 6 to each of the records referenced in the five cells until it reaches the last cell. After reaching the last cell, Step 216, microprocessor 108 determines that the fifth cell is the last cell in the "AN" slot, Step 220. Because the fifth cell is not empty, Step 222, and also does not contain a pointer, Step 224, microprocessor starts a new slot, Step 226. Starting a new slot requires three steps. First, microprocessor 108 inserts pointer &FREE37 into the last cell of slot "AN." The purpose of this pointer is to provide the address of the next slot—in this case, slot FREE37, though it could be any available free slot. Next, microprocessor 108 inserts pointer &AN into the first cell of slot FREE37. The purpose of this pointer is to assist browsing and will be explained in more detail later. Finally, microprocessor 108 compares Record 5 to Record 6 to determine their relative alphabetical rank, and accordingly inserts the INDEX value of Record 5 (which was previously in the fifth cell of slot "AN") into the second cell of slot FREE37, and inserts the INDEX value of Record 6 into the third cell of slot FREE37. Microprocessor 108 can continue assigning additional slots as needed in this manner. The results of this operation are shown in FIG. 5G.

Finally, microprocessor 108 reads in Record 7 and places that record in the second cell of slot "AN," moving the remaining INDEX values down by one cell. The results of this operation are shown in FIG. 5H. The foregoing example is likely to be a typical as address book entries are likely to be spread across many slots and is used to easily illustrate the algorithm and data structure. Moreover, additional FREE slots are "appended" if a free cell overflows such that the last cell of FREE37 would point to FREE38 and the first cell of FREE38 would point back to FREE37.

In accordance with another aspect of the present invention, the steps described above may be modified so as to cache a greater amount of working data in RAM 105 which, in turn, will minimize the read/write access time and reduce the number of times the EEPROM is written to. Those skilled in the art will recognize that minimizing the number of read/write cycles to the EEPROM will enhance the longevity of the device.

Figure 7:
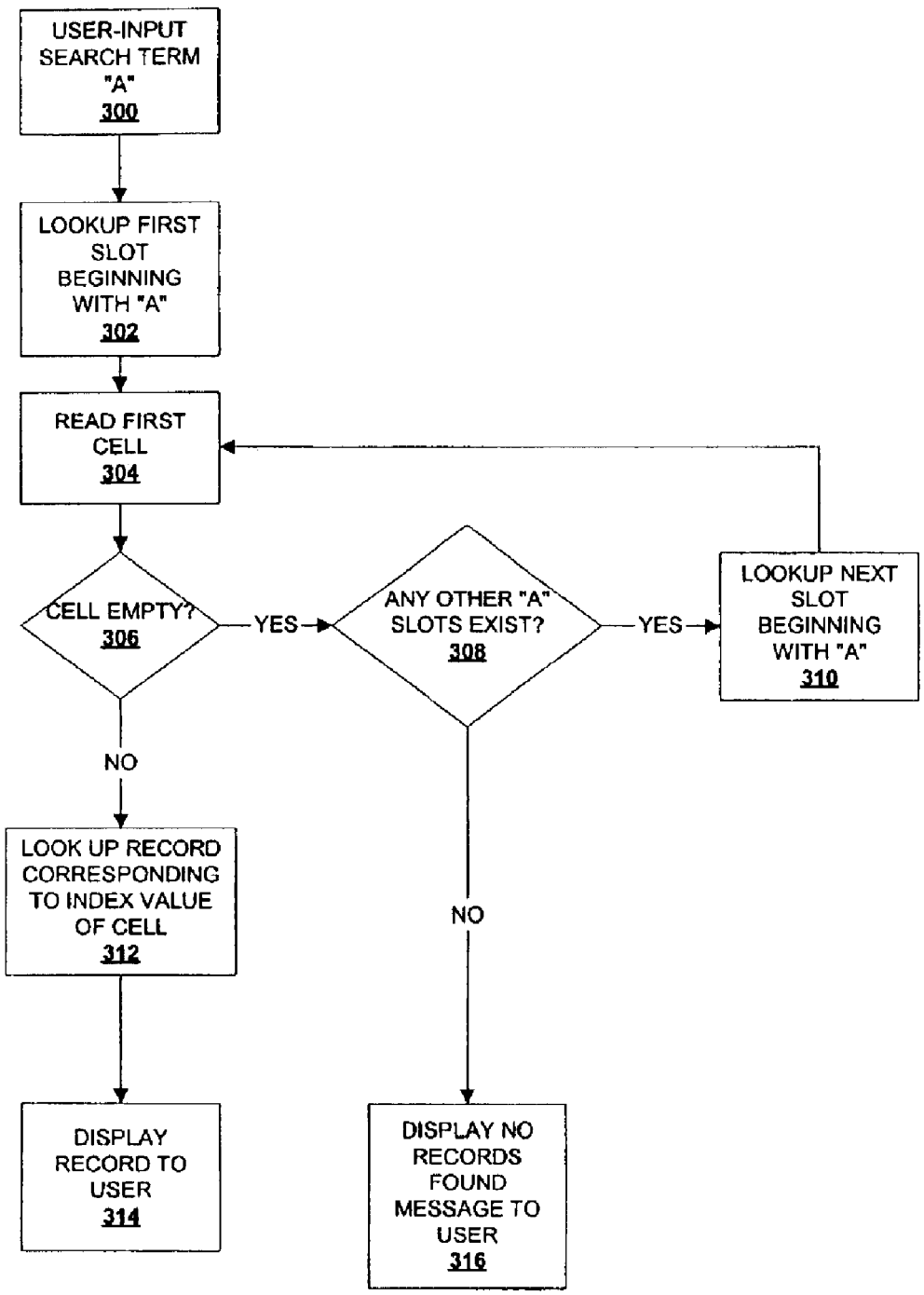
FIG. 7 is a flowchart illustrating the logical process required to perform a "quick search" of the second storage medium.

Several functions can be carried out on the telephone book data now stored in cordless telephone handset 120. For example, the user may perform a "quick search" by entering the first letter of a desired entry, wherein the cordless telephone handset 120 then displays the first matching entry. This "quick search" is explained in more detail in conjunction with FIG. 7. In Step 300, the user enters a single letter of the alphabet. For example, the user may enter the letter "A." Microprocessor 108 looks up the first corresponding home slot in Step 302—in the preferred embodiment described in this specification, the first home slot is "A0." At Step 304, microprocessor 108 reads the first cell of home slot "A0." Microprocessor 108 then determines whether the first cell is empty, Step 306. If the cell is empty, microprocessor proceeds to Step 308 where it determines whether any other home slots beginning with "A" exist. If other such slots exist, microprocessor 108 looks up the next consecutive home slot corresponding to "A" in Step 310. In the preferred embodiment described above, the next consecutive home slot would be "AA." Microprocessor 108 then repeats Steps 304, 306, 308 and 310 until a non-empty cell is found.

As soon as a non-empty cell is found, Step 306, microprocessor 108 requests the full record information using the INDEX value stored in that cell, Step 312. Microprocessor 108 then displays the record for the user in Step 314. If no records starting with the desired letter are found, an appropriate message is presented to the user in Step 316.

Figure 8:
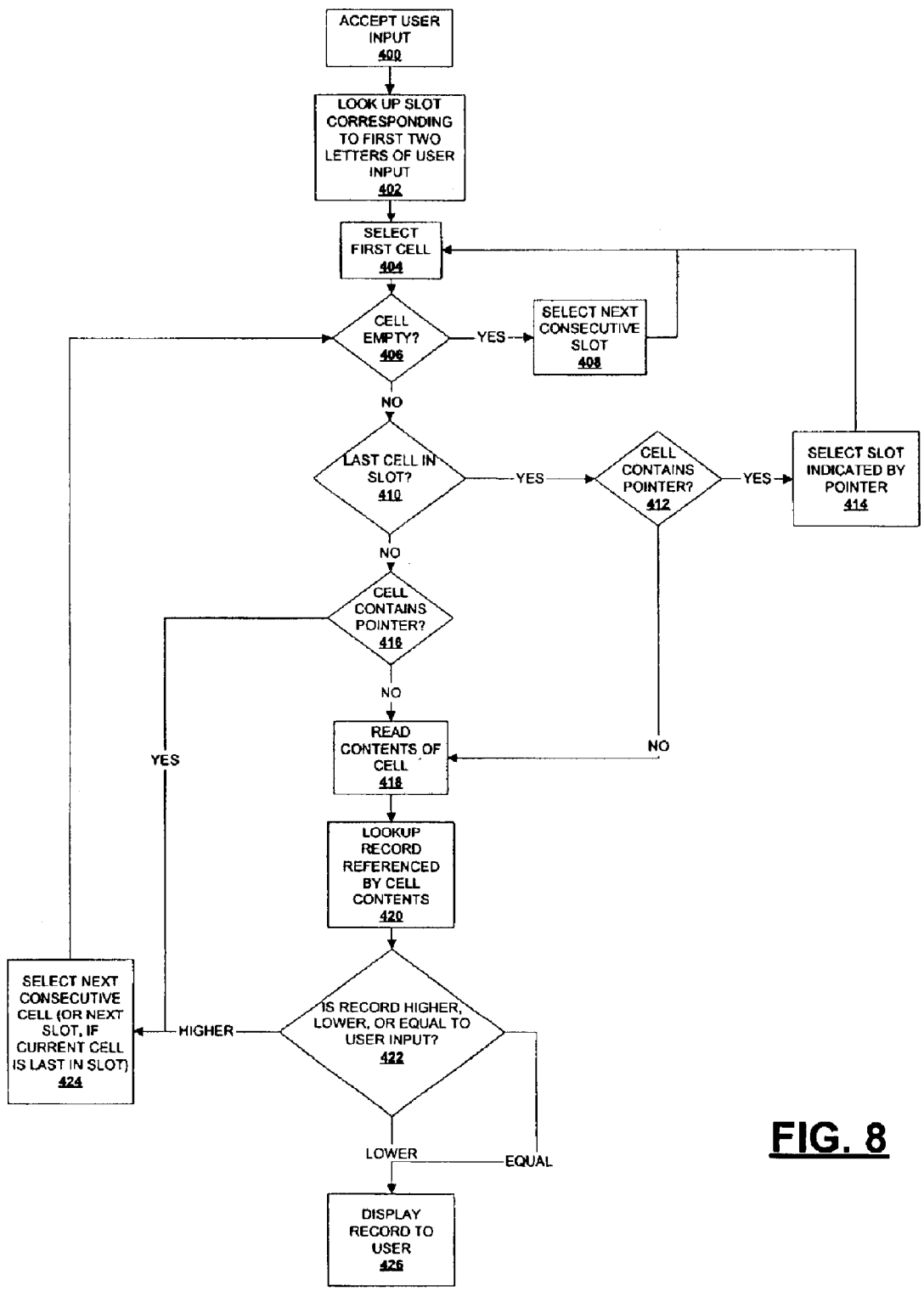
FIG. 8 is a flowchart illustrating the logical process required to perform a "full search" of the second storage medium.

A "full search" may also be carried out as described in connection with FIG. 8. The user inputs a search string in Step 400. Microprocessor 108 stores the search string in RAM 105 and looks up the home slot corresponding to the first two characters in the search string, Step 402. Microprocessor 108 selects the first cell of the home slot, Step 404, and determines whether the cell is empty, Step 406. If the first cell is empty, microprocessor 108 selects the next consecutive home slot until a non-empty slot is found, Step 408 (in general, whenever a record is not found, the microprocessor returns the next entry in the phonebook). Alternatively, microprocessor 108 may maintain a bitmap table indicating which slots are empty as a method of improving efficiency.

When microprocessor 108 finds a slot where the first cell is not empty, Step 406, microprocessor 108 checks to ensure that the current cell is not the last cell in the slot, Step 410. Of course, on the first pass after a slot has been selected, the current cell is always the first cell in the slot. Microprocessor 108 reads the contents of the current cell, Step 418, and looks up the corresponding record, Step 420. Microprocessor 108 then compares the record obtained in Step 420 to the user search string entered in Step 400. If the record obtained in Step 420 is alphabetically lower or equal to the search string entered in Step 400, microprocessor 108 displays the record. On the other hand, if the record obtained in Step 420 is alphabetically higher than the search string entered in Step 400, microprocessor 108 repeats the process for the next cell, Step 424. Microprocessor 108 thus sweeps each consecutive cell in each consecutive slot until it finds a record which is alphabetically lower than or equal to the search string.

Particularly, for each consecutive cell, microprocessor 108 checks to see if the cell is empty, Step 406. If the cell is empty, microprocessor 108 moves to the first cell of the next consecutive home slot, Steps 408, 404. Alternatively, if the current cell is the last cell in the slot, Step 410, and the cell contains a pointer, microprocessor 108 selects the slot indicated by the pointer, Step 414, and reads the next cell, Step 404. Of course, because the first cell of a free slot always contains a pointer, Step 416, microprocessor 108 must advance one more cell before reading the cell's value, Step 424.

Figure 9:
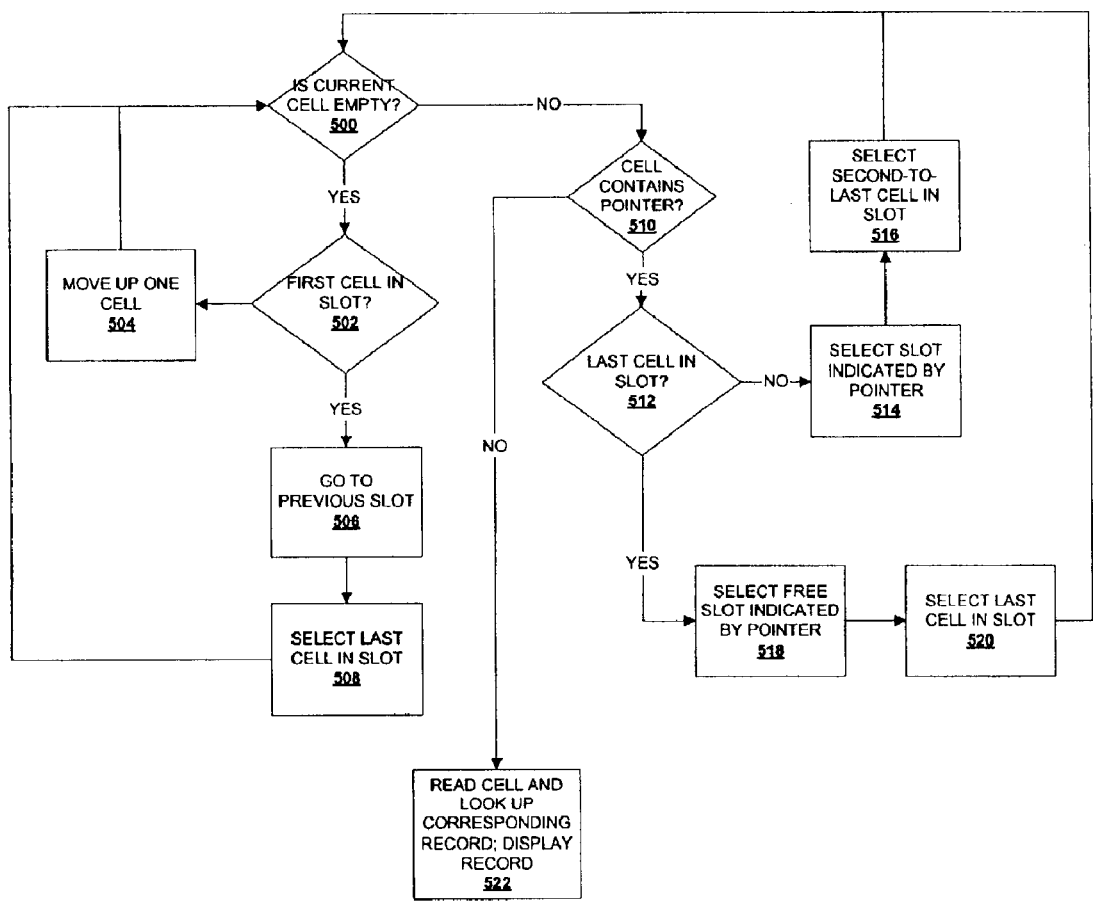
FIG. 9 is a flowchart illustrating the logical process required to perform a "browse up" function in the second storage medium.
Figure 10:
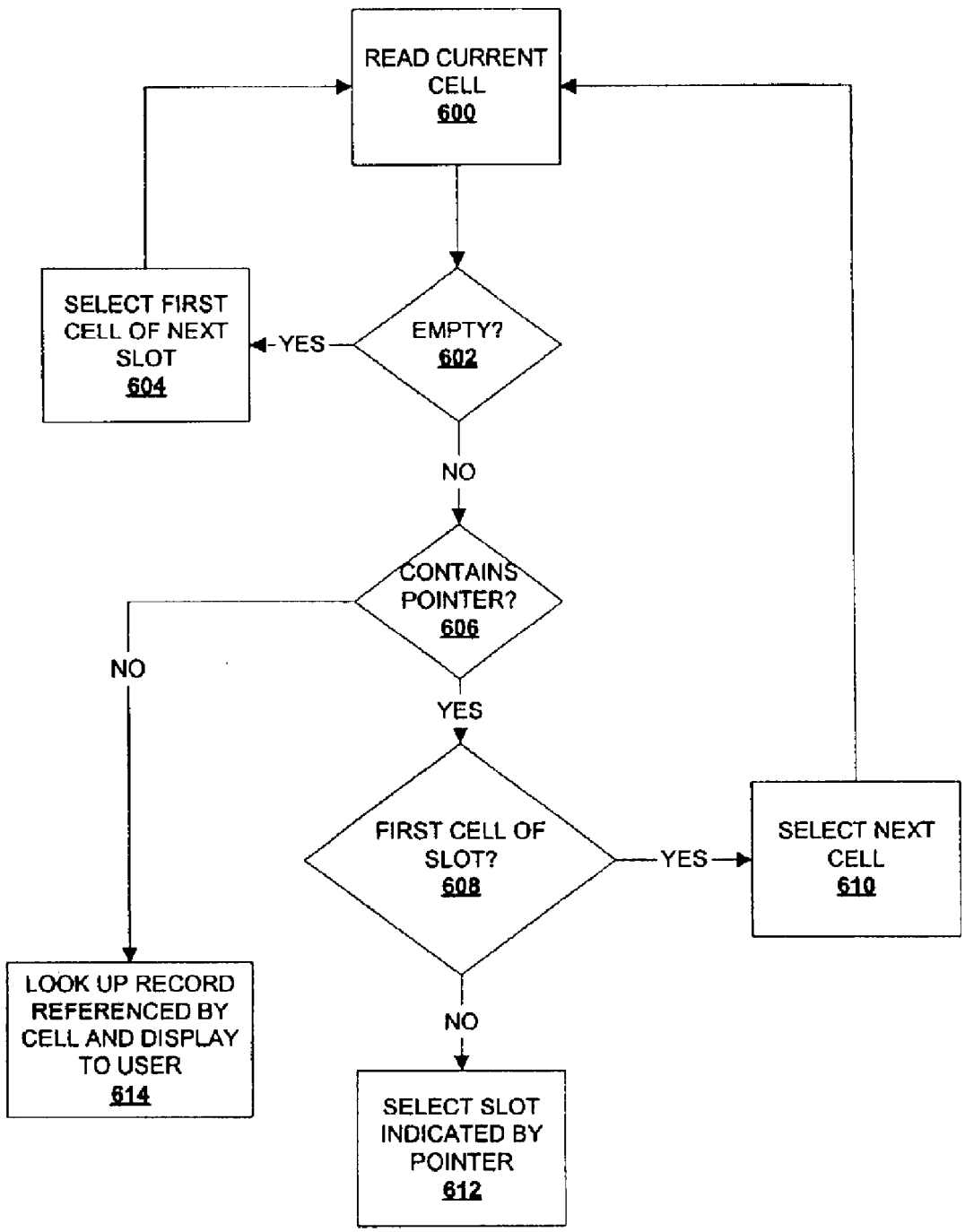
FIG. 10 is a flowchart illustrating the logical process required to perform a "browse down" function in the second storage medium.

The user may also browse storage medium 104. The steps for browsing storage medium 104 are shown in FIGS. 9 and 10. FIG. 9 illustrates a method for browsing "up" through the data stored in storage medium 104. Generally, a user may browse through the telephone book information using function keys or soft function keys (not shown). When the user presses the browse "up" key, the current cell is selected. If the current cell is empty, Step 500, and if it is not the first cell in the slot, Step 502, the previous cell is selected, Step 504, and the process is repeated. If the first cell in the slot is empty, Step 502, the last cell of the next alphabetically "higher" slot is selected, Steps 506, 508. Once a non-empty cell is located, that cell is read out if it does not contain a pointer, Step 522. If the cell to be read out contains a pointer, Step 510, the type of pointer is determined, Step 512. If the pointer points "up" (i.e., it is in the first cell of the current slot), the slot that the pointer points to is selected and the second-to-last cell of that slot is selected. On the other hand, if the pointer points "down," the slot being pointed to is selected and the last cell of that slot is selected (thus ensuring that one always begins at the bottom of a slot.)

Browsing "down" is explained in connection with FIG. 10. If microprocessor 108 encounters an empty cell, Step 602, microprocessor 108 simply cycles through the consecutive home slots until it finds a non-empty slot, Steps 604, 600. Of course, microprocessor 108 may also use the empty-slot bitmap described above for greater efficiency. Once microprocessor 108 encounters a non-empty slot, it checks to see if the cell contains a pointer, Step 606. If it does not, microprocessor 108 uses the INDEX value stored in the cell to look up and display the corresponding record, Step 614. If the cell does contain a pointer, microprocessor 108 either ignores it (if it is at the beginning of the slot, Step 608) and moves on to the next cell, Step 610, or microprocessor 108 moves to the first cell of the slot indicated by the pointer (if the pointer is in the last cell of the slot), Step 612.

When cellular telephone 132 is removed from its cradle 130, the index data table may remain in cordless telephone handset 120. Of course, cordless telephone handset 120 can not access the telephone book information stored in cellular telephone 132 when memory is not present to be accessed. However, the next time cellular telephone 132 is placed in cradle 130 (or interface 112 is otherwise enabled), cordless telephone handset 120 need not re-initiate the entire initialization process. Rather, microprocessor 108 again requests each consecutive record from cordless telephone 132. When an identical INDEX value is determined to already exist in storage medium 104, microprocessor merely updates the top bit of the INDEX value. Thus, the top bit of the INDEX value serves as an "update" flag. Any identical or new entries are given an "update" flag. All other entries are deleted after microprocessor 108 has completed inserting the new entries from cellular telephone 132. New address book entries are inserted in the hash as described in initialization procedure above. The above refinement permits fast resynchronization if cell address book was not significantly modified while being uncradled.

The foregoing description and drawings merely explain and illustrate the invention and the invention is not limited thereto, as those skilled in the art who have the disclosure before them will be able to make modifications and variations therein without departing from the scope of the invention. For example, as pointed out earlier in this specification, interface 112 may be any suitable interface, and may even be a wireless interface such as a Bluetooth™ radio interface. One skilled in the art would easily recognize that such an interface provides greater flexibility since the user would not be required to dock his cell phone at any particular location. Furthermore, such an interface would allow multiple devices to interact and hence the user would be able to access multiple sources of data at once. In addition, the present invention could be used to perform other functions with respect to cellular telephone 132. For example, one could delete entries from cellular telephone 132's address book, or perform basic control functions. Those skilled in the art will recognize that the functions available are only limited by those which the manufacturer makes available via interface 112. Finally, those skilled in the art will also recognize that the flowcharts and steps described above can be carried out in various manners while having the same result.

What is claimed as new and desired to be secured by Letters Patent is:

1. A method of accessing a telephone address book from a remote electronic device using an enhanced hash table to organize a local data structure on a local electronic device so as to provide alphanumeric scrolling, searching and sorted access to records in an unsorted data structure on the remote electronic device without making a physical copy of the remote data structure on the local device and in a manner which minimizes a local memory requirement and minimizes access to the remote device, the method comprising the steps of:

providing a data table of a finite length including a predetermined number of alphanumeric slots wherein each slot includes a predetermined number of cells for storage of index values corresponding to records based upon their alphanumerical properties;

providing a predetermined number of slots designated as free slots wherein each free slot includes a predetermined number of cells for storage of index values corresponding to records;

reading records stored in the remote device;

generating an index value corresponding to each record in the remote device;

alphanumerically sorting entries and storing each index value in a cell within the appropriate alphanumerical slot; whereby the index values serve as pointers to the records stored in the remote electronic device thereby omitting the need to store the entire record; and sorting entries and storing an index value in said free slots when all said cells within an alphanumerical slot are full.

2. The method of claim 1, further comprising updating the data table by:
   storing new index values corresponding to new records in an appropriate cell of a slot; and
   marking the cell as up-to-date to delete obsolete table entries;
   whereby the data table can be updated in a single pass of reading the remote address book once and only once for a complete update.

3. An apparatus for accessing telephone book information from a remote device comprising:
   a first device having a first storage medium and at least one record of telephone book information stored therein;
   a second device having a second storage medium;
   an interface through which the first device may communicate with the second device;
   at least one index value stored in a local data structure of said second storage medium, said index value uniquely identifying the at least one record of telephone information stored in the first storage medium, wherein a sequence of alphanumerically ordered index values is created, so as to provide alphanumeric scrolling, searching and sorted access to records in an unsorted data structure on the first device without making a physical copy of the remote data structure on the local device and in a manner which minimizes a local memory requirement and minimizes access to the first device.

4. The apparatus of claim 3 wherein the second storage medium further comprises:
   a series of slots;
   at least some of those slots being home slots for particular alphanumeric combinations;
   said slots further comprising a series of cells.

5. The apparatus of claim 4, wherein the at least one index value is stored in the home slot corresponding to the alphanumeric value of the associated record.

6. The apparatus of claim 5, wherein the second storage medium further comprises:
   the at least one index value stored in alphabetical order.

7. The apparatus of claim 3, wherein the at least one index value contains an update status flag.

8. The apparatus of claim 3 where the first electronic device is a cellular telephone and the second electronic device is a cordless telephone.

9. A system for accessing remote telephone book information, comprising:
   a remote device containing a list of telephone book records stored in a first medium;
   a local device having a second storage medium;
   an interface by which information is communicated between the local and the remote device;
   a data structure contained in the second storage medium, the data structure comprising a sorted list of index values, the sorted list of index value corresponding to an alphanumerically sorted list of telephone book records derived from the list of telephone book records stored in the first medium; and
   a software driven indexing routine for creating the sorted list of index values, wherein alphanumeric scrolling, searching and sorted access to the list of telephone book records in the first medium are performed without making a physical copy of the telephone book records in the second storage medium, so that access to the remote device and memory requirement in the local medium are minimized.

10. The system of claim 9, wherein the local device and the remote device are each chosen from the list comprising:
    a handset of a cordless telephone system;
    a personal digital assistant;
    a wireless telephone;
    a portable email terminal; and
    a personal computer.

11. The system of claim 10, wherein the local device comprises a handset of a cordless telephone system and the remote device comprises a cellular telephone.

12. The system of claim 11, further comprising;
    a remote microprocessor located in the cellular telephone and configured to read information from the first storage medium;
    a third storage medium located in the cordless handset; and
    a local microprocessor located in the cordless handset and cofigured to read and write from the second and third storage media and receive communications from the remote microprocessor.

13. The system of claim 9, wherein the interface comprises interface hardware and driver software that provide for message exchanges between the remote and local devices.

14. The system of claim 13, wherein the interface hardware is chosen from the list comprising:
    a UART connection;
    an RS232 cable;
    and infrared transceiver;
    a radio transceiver; and
    electrical contacts of a base unit configured to receive the remote and local devices.

15. The system of claim 11, wherein the interface is set up when the remote device is placed in a cradle of a base station of the cordless telephone system.

16. The system of claim 12, wherein the third storage medium comprises a volatile memory and the second storage medium comprises a non-volatile memory.

17. The system of claim 9, wherein the data structure comprises a series of slots, each slot further including a fixed number of cells for containing the index values.

18. The system of claim 17, wherein the series of slots comprises:
    a group of home slots assigned to specific alphanumeric sequences;
    a group of free slots configured to accommodate indexes when home slots are full;
    a group of numeric slots;
    and a group of symbol slots.

19. A method for managing telephone address book information in a plurality of devices, comprising:
    storing the telephone book information comprising phone book entries in a first memory of a first device;
    setting up an interface between the first device and a second device;
    reading the phone book entries into a volatile memory of the second device;
    providing a data structure in the second device, the data structure including a predetermined number of alphanumeric slots wherein each alphanumeric slot includes a predetermined number of cells for storage of index values corresponding to records based upon their alphanumerical properties;

storing an index value corresponding to each phone book entry in the data structure, wherein each index value serves as a pointer to the records stored in the first memory thereby omitting the need to store the entire record in the data structure.

20. The method of claim 19, further comprising:

providing a predetermined number of free slots in the data structure, wherein each free slot includes a predetermined number of cells for storage of index values; and storing an index value in the free slots when all the cells within an alphanumerical slot are full.

21. The method of claim 20, further comprising:

selecting a designated index number that is displayed in the second device;

sending a request to retrieve the phone book entry corresponding to the designated index number from the first device; and viewing the phone book entry corresponding to the second index number in the second device.

22. The method of claim 19, wherein the data structure is stored in a non-volatile memory.

23. The method of claim 19, wherein the first device is a cellular telephone and the second device is a handset of a cordless telephone system.

24. The method of claim 23, wherein setting up an interface comprises placing the cellular telephone in a cradle of the cordless telephone system.

25. The method of claim 21, wherein the request to retrieve a telephone book entry is sent when the cordless handset is placed in a base unit of the cordless telephone system.

* * * * *